United States Patent [19]

Pontefract

[11] Patent Number: 5,198,681
[45] Date of Patent: Mar. 30, 1993

[54] OPTICAL PROBE SHIELD

[75] Inventor: Robert A. Pontefract, Chelmsford, Mass.

[73] Assignee: Scully Signal Company, Wilmington, Mass.

[21] Appl. No.: 658,544

[22] Filed: Feb. 21, 1991

[51] Int. Cl.⁵ ............................................. G01F 23/28
[52] U.S. Cl. .................................. 290/577; 340/619
[58] Field of Search ............... 250/577, 574, 578.1; 340/619; 73/293

[56] References Cited

U.S. PATENT DOCUMENTS 4,961,069  10/1990  Tsaprazis ........................ 250/577
5,054,319  10/1991  Fling .............................. 259/577

Primary Examiner—Constantine Hannaher
Assistant Examiner—Richard Hanig
Attorney, Agent, or Firm—Wolf, Greenfield & Sacks

[57] ABSTRACT

An apparatus for protecting and optically isolating the optical element of the probe used for sensing liquid levels includes a tubular body formed from a rigid, non-reflective material which slides over the optical probe. The probe is mounted within the tubular body to create a gap between the shield and the probe in which liquid collects. An open end of the tubular body is cut at an angle and tapers to a point at the widest part of the gap. The tapered point and gap width are arranged so that, when the liquid level falls below the probe end, the surface tension of liquid running down the tapered point overcomes the surface tension of the liquid in the gap and draws the fluid out of the shield.

15 Claims, 2 Drawing Sheets

OPTICAL PROBE SHIELD

FIELD OF THE INVENTION

The present invention relates to optical probes, and more particularly, to a shielding device which attaches to an optical probe used in sensing liquid levels.

BACKGROUND OF THE INVENTION

Optical probes are currently used in control systems which continuously monitor the liquid level in vessels and containers. Such level sensing probes are used commonly in tank trucks and other enclosures where overfill protection is critical. One such probe, commercially available as models SP FU/MHC or SP FU/MHCF from Scully Electronic Systems, Wilmington, Mass. is illustrated in FIG. 1. The probe 40, comprises a cylindrical tube 44 having a light source 46, such as an infrared LED (IRLED), and a light detector 48, such as a photo transistor positioned at one end thereof. Light source 46 and light detector 48 are optically coupled to a 45° glass prism 42 via mirror 45. The glass prism 42 is exposed at a second end of the tube, and is positioned perpendicularly to the tube axis 43. The liquid level is detected by aiming a pulsed beam of infrared light from the IRLED at one of the faces of the prism 42. If the prism tip is dry, the light is reflected off the other face of prism 42 and back into the optically matched photo transistor, completing the optical circuit and sending a "dry" signal to a controller 50 coupled to the probe. If the prism tip is wet, the light beam is refracted out of the first prism face, breaking the optical circuit and causing a "wet" signal to be sent to the controller 50.

Use of the probe, by itself, however presents some practical problems. First, the refractive properties of the prism tip are directly related to its physical integrity. Any damage to the prism tip will likely result in an inaccurate output signal from the probe. Accordingly, the prism tip must be physically protected from both the walls of the container and any solid contaminents which may be present in the fluid being measured. Second, the prism tip must be isolated from any stray light in the container which may be refracted through the prism, resulting in false readings. Third, light refracted out of the prism during the measurement process must be prevented from reentering the prism, resulting in false readings. Fourth, liquid may become trapped, due to the surface tension of the liquid, between the probe and any adjacent surfaces, resulting in false readings. Finally, the probe itself should be electrically grounded to ensure the integrity of the signal produced thereby.

Accordingly, it is an object of the present invention to provide a shield which physically protects the prism of an optical probe.

Another object of the present invention is to provide a prism shield which prevents stray light from the vessel interior from entering the prism.

A further object of the present invention is to provide a prism shield which prevents light refracted out of the prism from being reflected back through the prism in a wet condition.

Yet another object of the present invention is to provide a prism shield that ensures that all liquid trapped between the probe and itself will run off the probe.

Still another object of the present invention is to provide a prism shield which permits grounding of the probe through the shield itself.

SUMMARY OF THE INVENTION

The above objects are achieved in one illustrative embodiment of the invention which comprises a shield that slides over the end of the optical probe and surrounds the optical element to mechanically protect and optically isolate it. The shield is open at one end to allow liquid to enter and reach the optical element. The shield is shaped and mounted on the probe so that liquid flows out of the shield at one location when the liquid level falls below the optical element and so that the natural surface tension of the liquid causes substantially all of the liquid to be drawn out of the space between the shield and the probe by the liquid flow.

According to the one embodiment of the present invention, the shield has a tubular body comprising a rigid, non reflective material which slides over the optical probe. The probe is mounted within the tubular body to create a gap between the shield and the probe in which gap liquid collects. The open end of the tubular body is cut at an angle and tapers to a point at the widest part of the gap. The cut angle and gap width are arranged so that, when the liquid level falls below the probe end and liquid begins to drain out of the gap, the surface tension of liquid running down the shield point overcomes the surface tension of the liquid in the gap and draws the fluid out of the shield.

The foregoing and other features, objects and advantages of the invention will be more fully understood by reading the detailed description below in conjunction with the drawing.

DETAILED DESCRIPTION

Figure 1:
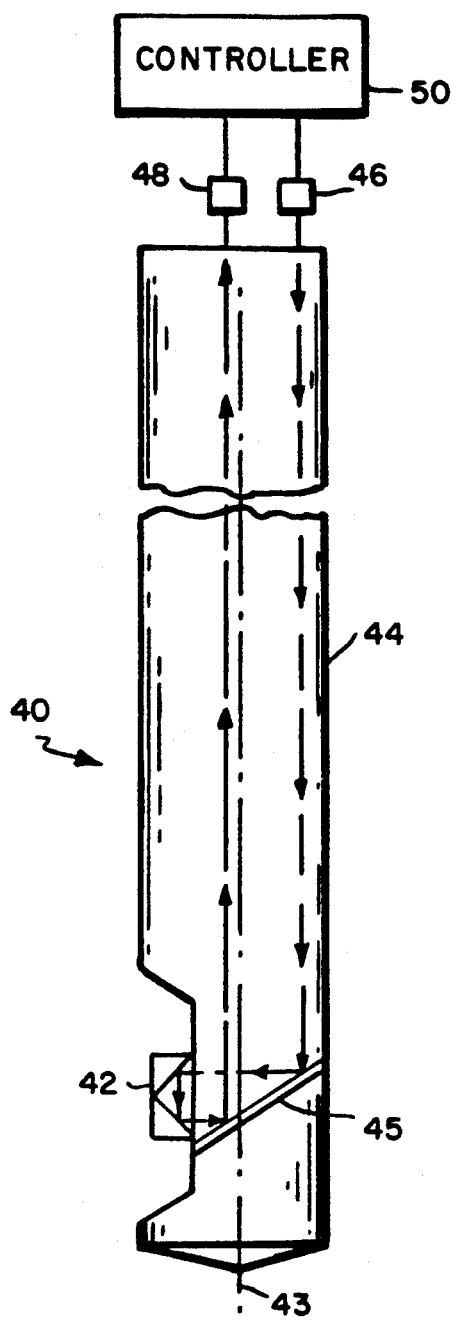
FIG. 1 is a side, cut-away view of an optical liquid level sensing probe used in conjunction with the present invention.

Referring to the drawings, and in particular, FIGS. 2–6, a prism shield 10 in accordance with an illustrative embodiment of the present invention is disclosed. Shield 10 comprises a main body section 12 with a body section 14 and a body section 16 integrally formed at opposite ends thereof. Main body 12 has a generally cylindrical shape with a bore 18 extending therethrough. In the preferred embodiment, main body section 12 may have an exterior diameter of approximately 1.375" and an interior diameter, i.e., the diameter of bore 18, of approximately 1.125". The length of main body 12 may be approximately 1.4".

A pair of vent holes 20A and 20B in the form of lateral aperatures extend through main body 12, as indicated. In the illustrative embodiment vent holes 20A–B are diametrically opposed to each other about the circumference of the main body 12, however, it will be obvious to those reasonably skilled in the art that vent holes 20A–B may have other positions relative to one another and do not have to be diammetrically opposed to each other. The combined cross sectional area of vent holes 20A-B may be equal to the cross sectional area of bore 18 minus the cross sectional area of probe 40. In the illustrative embodiment, vent holes 20A-B each have a diameter of approximately 0.375". An annular groove 22 is formed on the exterior of main body 12 and serves as a visual liquid level set point, as explained hereinafter. A third lateral aperature, mounting hole 24, extends through the wall of main body section 12 at a point below annular groove 22, as illustrated. The area immediately surrounding mounting hole 24, is characterized by reduced wall thickness of approximately 0.060", to accommodate the head of a screw which extend through hole 24 and secures shield 10 to the optic probe, as explained hereinafter.

Body section 14 is formed integrally with main body 12 in the region adjacent vent holes 20A-B. Section 14 is characterized by an eccentric tapering of bore 18 from a diameter of approximately 1.125" to a diameter of approximately 1". The exterior of body section 14 is characterized by an angled, annular bevel which terminates with an opening 26. Body section 14 enables shield 10 to be slid over one end of optical probe 40, with probe 40 being positioned eccentrically within bore 18. Probe 40 is positioned eccentrically within bore 18 to facilitate mounting thereof, as explained previously. It will be obvious to those reasonably skilled in the art that bore 18 may have a non eccentric shape, for example symmetric, without effecting the function of the shield. Likewise, probe 40 may be disposed other than eccentrically within shield 10 without effecting the shield performance, provided enough space exists between prism 42 and bore 18 for fluid to reach the prism.

Body section 16 is formed integrally with main body section 12 near mounting hole 24, as illustrated. Body section 16 is characterized by an arcuate, angled tapering of shield 10 to form an irregularly shaped opening 30 having an extreme point or drain 28, as illustrated. Liquid enters and exits bore 18 through opening 30, as explained hereinafter.

Probe shield 10 is preferably formed from a rigid material which is non reflective and preferably black in color. Materials suitable for use as shield 10 include PVC, polyester or other plastics, passivated stainless steel, annodized aluminum, or flat painted metal. The rigidity of shield 10 protects prism 42 of probe 40 from physical damage. The non reflective nature of shield 10 prevents stray light or light refracted from prism 42 from reflecting off the interior walls of bore 18 and back into the prism.

Figure 6:
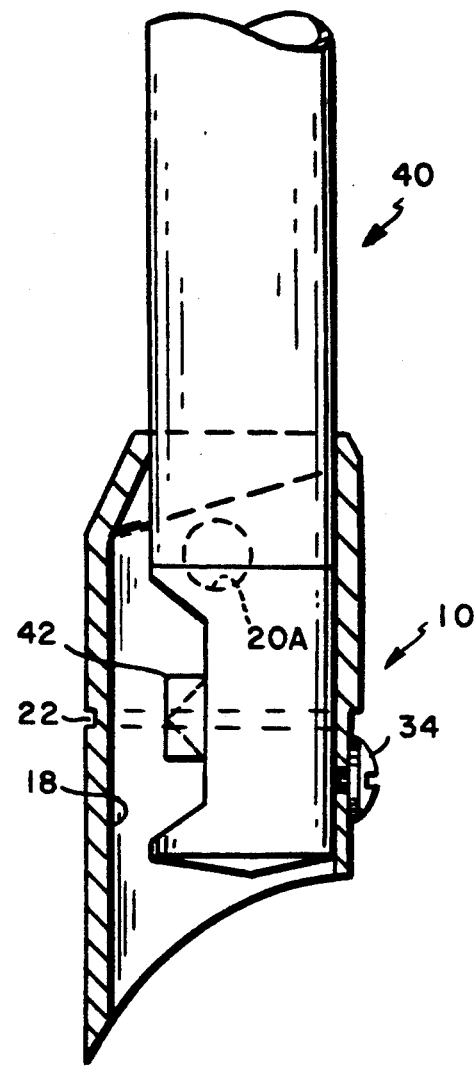
FIG. 6 is side, cut away view of the probe shield of FIG. 2 with the optical probe of FIG. 1 inserted therein.
Figure 2:
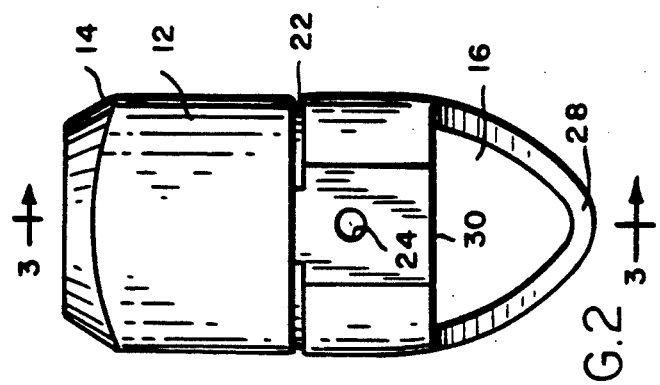
FIG. 2 is a front view of an optical probe shield in accordance with the present invention.
Figure 5:
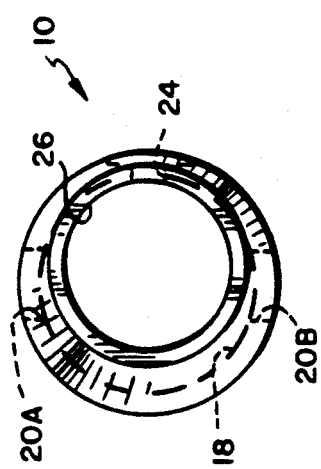
FIG. 5 is a top view of the probe shield of FIG. 2.
Figure 3:
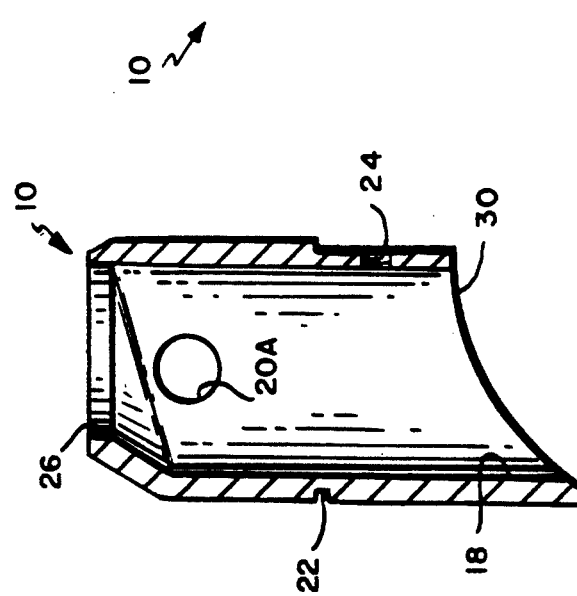
FIG. 3 is a side, cut away view of the probe shield of FIG. 2 as seen along line 2—2.
Figure 4:
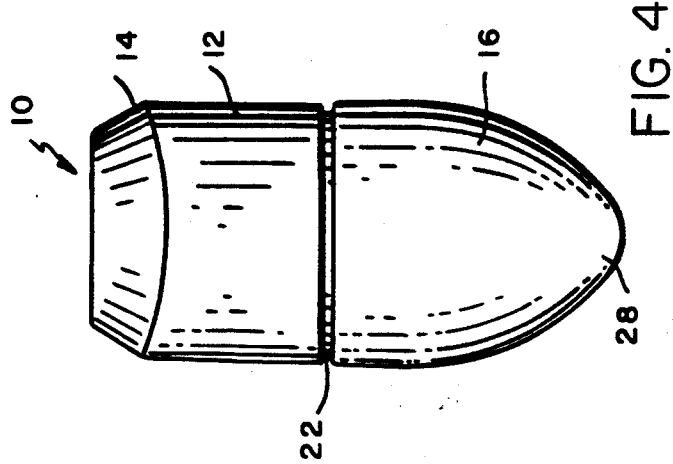
FIG. 4 is a rear view of the probe shield of FIG. 2.

The operation of shield 10 in conjunction with optical probe 40 is described as follows. Referring to FIG. 6, probe 40, as previously described, is received within opening 26 of shield 10 and advanced through bore 18 until the end containing prism 42, is positioned adjacent opening 30. When properly positioned, the prism 42 is situated within the main body section 12 at annular groove 22, which indicates the liquid level required for a "wet" reading from the probe. Once probe 40 is positioned within shield 10, a screw 34 is threaded through mounting hole 24 to secure shield 10 about probe 40, as illustrated. Screw 34 is preferably formed of an electrically conductive metal which, when coupled to electrical ground, also grounds probe 40.

As shown in FIG. 6, probe 40 is positioned eccentrically in bore 18. As the liquid level in the container rises, the liquid fills the crescent shaped, annular gap formed between shield 10 and probe 40. Vent holes 20A-B allow air or other gases to escape from the gap and enable fluid flow freely between bore 18 and the exterior of shield 10. Vent holes 20A-B are positioned far enough above the prism 42 to prevent any stray light from entering bore 18.

When the liquid level in the container is equal to or greater than the set point at annular groove 22, infrared light will be refracted out of the prism 42 and strike the non-reflective, interior surface of bore 18. The refracted light is absorbed and prevented from reflecting off of the wall of bore 18 and back into prism 42. The non-reflective nature of shield 10 further prevents any stray light, entering from opening 26 or opening 30 from reflecting off the interior wall of bore 18 and falling incident upon prism 42.

When the liquid level in the container falls far enough beneath the set point at annular groove 22, the width of the gap between probe 40 and the interior wall of bore 18 is sufficiently large so that the surface tension which holds the liquid in the gap is less than the surface tension which draws the liquid downward toward drain 28. As a result, the surface tension of liquid flowing toward drain 28 overcomes the surface tension of the liquid in the gap and draws the fluid out of shield 10. Body section 16 and drain 28, therefore, facilitate complete run off of liquid from prism 42, and reduce the chance of false readings caused by fluid trapped between shield 10 and probe 40.

Probe shield 10 further provides a rigid sheath about probe 40 which mechanically protects the probe, particularly prism 42, from physical damage possibly caused by the container walls or from solid contaminants floating in the liquid.

Accordingly, it will be appreciated that the detailed disclosure has been presented by way of example only and is not intended to be limiting. Various alterations, modifications, and improvements will readily occur to those skilled in the art, and may be practiced without departing from the spirit and scope of the invention. The invention is limited only as required by the following claims and equivalents thereto.

What is claimed is:

1. An apparatus for protecting and optically isolating the optical element of a probe used for sensing liquid levels, said apparatus comprising:
   a body member adapted to slidably receive said probe through a first end thereof and expose said probe to a liquid through a second end thereof wherein said body member is disposed in close proximity to and along an axis substantially parallel to the face of the optical element and is formed from a non-reflective material; and
   means, integrally formed with said body member, for purging liquid disposed intermediate said body member and said probe.

2. The apparatus of claim 1 wherein said body member has a substantially cylindrical shape.

3. The apparatus of claim 1 wherein said body member is formed from a substantially rigid material.

4. The apparatus of claim 2 wherein said means for purging liquid comprises a tapered projection integrally formed with said body member at the second end thereof.

5. The apparatus of claim 4 wherein said means for purging liquid further comprises a lateral aperture disposed in the proximity of the first end of said body member for providing fluid communication between the interior and exterior of said cylindrical body member.

6. The apparatus of claim 4 in combination with an optical probe used for liquid level sensing.

7. The combination of claim 6 wherein liquid disposed intermediate said body member and said probe is purged therefrom at said tapered projection by the capillary effect.

8. An apparatus for protecting and optically isolating the optical element of a probe used for sensing liquid levels, said apparatus comprising;
   a tubular body having an open first end, and open second end, and a bore extending therethrough, said first end having an extreme point,
   said tubular body having a lateral aperature to provide fluid communication between said bore and the exterior of said tubular body, wherein said tubular body is disposed in close proximity to and along an axis substantially parallel to the face of the optical element and being formed from a non-reflective material.

9. The apparatus of claim 8 wherein said tubular body is adapted to slidably and partially receive said probe within said bore and to maintain said probe therein.

10. The apparatus of claim 8 wherein said tubular body comprises a substantially rigid material.

11. The apparatus of claim 9 wherein the first end of said tubular body is formed at an angle to create said extreme point.

12. The apparatus of claim 8 in combination with an optical probe used for liquid level sensing.

13. The combination of claim 14 wherein liquid disposed intermediate said tubular body and said probe is drawn from said bore at said extreme point by the capillary effect.

14. An apparatus for protecting an optically isolating the optical element of a probe used for sensing liquid levels, said apparatus comprising:
   a body member adapted to slidably receive said probe through a first end thereof and expose the said probe to a liquid through a second end thereof, wherein said body member has a substantially cylindrical shape; and
   means, integrally formed with said body member, for purging liquid disposed intermediate said body member in said probe, wherein said means for purging liquid comprises a tapered projection integrally formed with said body member at the second end thereof.

15. An apparatus for protecting and optically isolating the optical element of a probe used for sensing liquid levels, said apparatus comprising:
   a tubular body having an open first end, an open second end, and a bore extending therethrough, said first end having an extreme point,
   said tubular body having a lateral aperature to provide fluid communication between said bore and the exterior of said tubular body, wherein said tubular body comprises a substantially rigid material, and wherein liquid disposed intermediate said tubular body and said probe is drawn from said bore at said extreme point by the capillary effect.

* * * * *